United States Patent

[11] 3,609,119

| [72] | Inventors | Eberhard Pilz<br>Bobingen uber Augsburg;<br>Klaus Hoheisel, Wiesbaden-Biebrich;<br>Eberhard Werner, Wiesbaden-Biebrich, all of Germany |
|---|---|---|
| [21] | Appl. No. | 780,572 |
| [22] | Filed | Dec. 2, 1968 |
| [45] | Patented | Sept. 28, 1971 |
| [73] | Assignee | Kalle Aktiengesellschaft<br>Wiesbaden-Biebrich, Germany |
| [32] | Priority | Dec. 4, 1967 |
| [33] | | Germany |
| [31] | | P 16 94 548.5 |

[54] POLYESTERS STABILIZED WITH THIOPHOSPHITES
8 Claims, No Drawings

[52] U.S. Cl. .................................................. 260/45.7
[51] Int. Cl. ...................................................... C08g 51/58
[50] Field of Search ........................................ 260/45.7 PS

[56] References Cited
UNITED STATES PATENTS

| 2,437,232 | 3/1948 | Rothrock, Jr. et al. | 260/75 |
| 3,420,801 | 1/1969 | Fitz | 260/75 |
| 3,446,763 | 5/1969 | Okuzumi | 260/22 |

*Primary Examiner*—Donald E. Czaja
*Assistant Examiner*—R. A. White
*Attorney*—James E. Bryan ABSTRACT: This invention relates to a thermostabilized linear polyester or copolyester containing 0.001 to 5 percent by weight, calculated on the weight of the diester component employed, of a stabilizer having the formula

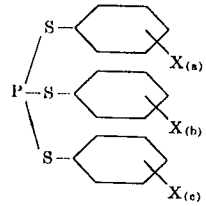

wherein, $a$, $b$, and $c$ are integers between 1 and 5, preferably 1 to 3, X is a straight-chain or branched-chain or cyclic saturated hydrocarbon group having not in excess of 10, preferably one to four, carbon atoms, particularly methyl or tert.-butyl groups, or an aromatic group, particularly a phenyl group.

POLYESTERS STABILIZED WITH THIOPHOSPHITES

This invention relates to thermostabilized linear polyesters or copolyesters, i.e. polymeric compounds containing repeating ester groups in their chains and which are formed in the presence of catalysts by esterification of an organic dicarboxylic acid or by reesterification of an ester of a dicarboxylic acid with a glycol with subsequent polycondensation. High-grade linear polyesters are obtained from terephthalic acid dimethyl ester and ethylene glycol using the known reesterification and polycondensation catalysts.

In addition to terephthalic acid, other aliphatic or aromatic dicarboxylic acids or disulfonic acids may be employed as acid components in the production of polyester, e.g. phthalic acid, isophthalic acid, oxalic acid, adipic acid, sebacic acid, azelaic acid, naphthalene-2, 6-disulfonic acid or diphenyl dicarboxylic acid. In addition to ethylene glycol, aliphatic, cycloaliphatic or aromatic diols having from two to 14 carbon atoms may be used as the diol component, e.g. diethylene glycol, dibutylene glycol, polyethylene glycol, cyclohexane dimethanol, and neopentylene glycol, as well as the phenols hydroquinone or dihydronaphthalene. The dicarboxylic acid and diol components are used individually or, for copolyesters, in admixture with other dicarboxylic acid and diol components.

The linear polyesters are distinguished by numerous advantages which permit their application and processing into fibers, filaments, films, coatings, injection-molded articles and the like. But all polyesters prepared from the most varied units and with quite different catalysts have a disadvantage which considerably impairs their processing qualities and possibilities of application, viz their decomposition behavior, particularly under thermal stress. In addition to thermal decomposition, hydrolytic and oxidative decompositions also must be considered.

It is known that an improvement in the thermostability of polyester products can be achieved by the addition of phosphorous acid or phosphorus-containing organic compounds such as triphenyl phosphite or triphenyl phosphate, ammonium phosphite or ammonium phosphate. But the mentioned phosphorus-containing compounds have the disadvantage of being volatile, for example triphenyl phosphite or triphenyl phosphate, or of disintegrating, for example phosphorous acids, under the conditions prevailing during polycondensation, so that the desired optimum improvement of thermostability is not achieved.

The present invention improves the thermostability of the mentioned polymeric compounds, particularly polyethylene terephthalate, by the addition o suitable stabilizers.

This result is achieved when the linear polyesters or copolyesters contain at least one of the compounds of the general formula

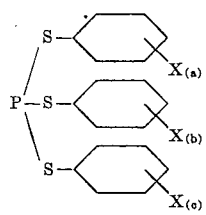

wherein
  $a$, $b$, and $c$ are integers between 1 and 5, preferably 1 to 3, and
  X is a straight-chain or branched-chain or cyclic saturated hydrocarbon group having not in excess of 10, preferably one to four, carbon atoms, particularly methyl or tert.-butyl groups, or an aromatic group, particularly a phenyl group, as the thermostabilizing agent in quantities ranging from 0.001 to 5 percent by weight, calculated on the quantity of the diester component employed as a precursor of the polyester.

Particularly favorable results are achieved when the compounds of the invention are present in quantities ranging from 0.01 to 0.5 percent by weight, calculated on the quantity of diester component employed.

It unexpectedly has been found that aromatic thiophosphites substituted in the benzene nucleus have a much better stabilizing effect against oxidation and heat than have phosphorous acid or alkyl or aryl phosphites and phosphates.

Another advantage of these alkylated phenyl thiophosphites is the fact that they are chemically inert as compared with phosphorous acid, are less easily volatile than, for example, triphenyl phosphite, and do not form any undesirable byproducts which could have an adverse effect on the production process.

The stabilizer in accordance with the invention is incorporated into the reaction mixture either prior to or during polycondensation by adding it individually or together with glycols. Advantageously, it is added with stirring before the end of the polycondensation process at temperatures ranging from 215° to 250° C.

The aromatic thiophosphites substituted in the benzene ring in accordance with the invention are chemically inert and may be incorporated into the polyester chain during the polycondensation process. In addition to deactivating the catalyst, they have a reducing effect and, furthermore, favorably influence the quality of the end products by causing the formation of light and colorless products which are particularly suitable for the desired end use.

The invention will be further illustrated by reference to the following examples. In the examples, the percentages by weight refer to the quantity of the diester component employed, in particular of dimethyl trephthalate.

Example 1

Six hundred parts by weight of dimethyl terephthalate and 480 parts by weight of ethylene glycol to which 0.023 percent by weight of zinc acetate has been added are dissolved together in a reaction vessel with heating and stirring and the reesterified while distilling off methanol over a heated reflux condenser. Towards the end of the reesterification process at a temperature between 215° and 250° C, $1.57 \cdot 10^{14}$ mole of tri-p-tert. -butylphenylthiophosphite, per mole of dimethyl terephthalate employed, dissolved in ethylene glycol, is added; 0.04 percent by weight of $Sb_2O_3$ is added as a condensation catalyst. While separating the excess of ethylene glycol, the temperature in the reactor is raised to 255° C. and, at this temperature, evacuation is begun and continued until a pressure of 0.3 mm. Hg. is finally reached. In accordance with a predetermined heating program, the temperature is raised to 280° C. concurrently with the evacuation process. Thermostable, colorless products are obtained which have an intrinsic viscosity of 0.68.

The thermostability of the polyester products thus obtained is determined as follows:

Approximately 10 g. of granulated polyester are heated to 300° C. in an electrically heated metal block having a recess 10 mm. wide, and a 1-mm. hole-type nozzle thereon which can be unscrewed. By means of a stamp, the melt is extruded after the polyester is heated in the recess of the metal block to 300° C. for 20 minutes. This thermally decomposed polyester is evaluated for the decomposition characteristics thereof by determining the percentage viscosity decrease and the percentage carboxyl group increase. Data are given in table I below.

Example 2

Six hundred parts by weight of dimethyl terephthalate and 480 parts by weight of ethylene glycol to which 0.0767 percent by weight of calcium acetate has been added are reesterified according to the procedure of example 1. Towards the end of the reesterification reaction, 2.5·10¹⁴ mole of tri-p-tert.-butyl-o-tolylthiophosphite per mole of dimethyl terephthalate is added at a temperature between 215° and 250° C. Polycondensation is carried out as described in example 1, using 0.04 percent by weight of $Sb_2O_3$. Thermostable products are obtained which have an intrinsic viscosity of 0.68. The thermostability is evaluated as in example 1 and data are given in Table I below.

Comparison test

Under the same molar quantities, triphenyl phosphite or phosphorus acid is added instead of the substituted phenyl thiophosphites used in accordance with the invention and described in examples 1 and 2. The foregoing test results in the data given in table I below.

TABLE 1

| | Catalyst | Percent by weight* | Stabilizer | Percent by weight* | DMT | Decrease in viscosity, percent | Increase in COOH groups, percent |
|---|---|---|---|---|---|---|---|
| | | | | | | Decomposition behavior after 20 minutes at 300° C. | |
| Example 1 | $Zn(CH_3COO)_2$ $Sb_2O_3$ | 0.023 0.03 | Tri-p-tert.-butyl-phenylthiophosphite. | 0.0425 | 1.57·10⁻⁴ | 13.4 | 85 |
| Example 2 | $Ca(CH_3COO)_2$ $Sb_2O_3$ | 0.0767 0.04 | Tri-p-tert.-butyl-o-tolylthiophosphite. | 0.074 | 2.5·10⁻⁴ | 14 | 150 |
| Comparison values | $Zn(CH_3COO)_2$ $Sb_2O_3$ | 0.023 | Triphenylphosphite | 0.025 | 1.57·10⁻⁴ | 21.8 | 155 |
| Comparison values | $Ca(CH_3COO)_2$ $Sb_2O_3$ | 0.0767 0.04 | $H_3PO_3$ | 0.01 | 2.5·10⁻⁴ | 19.2 | 135 |

*The percentages are calculated upon the quantity of dimethyl terephthalate employed.
DMT=dimethyl terephthalate.

It will be obvious to those skilled in the art that many modifications may be made within the scope of the present invention without departing from the spirit thereof, and the invention includes all such modifications.

What is claimed is:

1. A saturated linear polyester with improved properties of thermostability containing as a catalyst calcium acetate or zinc acetate and 0.001 to 5 percent by weight, calculated on the quantity of the diester component employed as a precursor of the polyester, of at least one themostabilizer having the formula

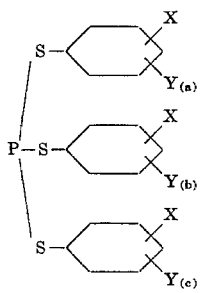

wherein
  $a$, $b$, and $c$ are 0 or 1,
  X is a tertiary butyl group, and
  Y is a straight-chain saturated aliphatic group having not in excess of 10 carbon atoms.

2. A thermostabilized linear polyester according to claim 1 in which the stabilizer is present in a quantity in the range of 0.01 to 0.5 percent by weight, calculated on the quantity of the diester component employed as a precursor of the polyester.

3. A thermostabilized linear polyester according to claim 1 having a viscosity decrease less than about 15 percent and a carboxyl group increase less than about 150 percent after heating for 20 minutes at a temperature of 300° C.

4. A thermostabilized linear polyester according to claim 1 in which the polyester is polyethylene terephthalate.

5. A shaped article made from a saturated linear polyester with improved properties of thermostability containing as a catalyst calcium acetate or zinc acetate and 0.001 to 5 percent by weight, calculated on the quantity of the diester component employed as a precursor of the polyester, of at least one thermostabilizer having the formula

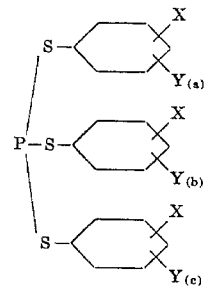

wherein
  $a$, $b$, and $c$ are 0 or 1,
  X is a tertiary butyl group, and
  Y is a straight-chain saturated aliphatic group having not in excess of 10 carbon atoms.

6. A shaped article according to claim 5 in which the stabilizer is present in a quantity in the range of 0.01 to 0.5 percent by weight, calculated on the quantity of the diester component employed as a precursor of the polyester.

7. A shaped article according to claim 1 in which the themostabilized linear polyester has a viscosity decrease less than about 15 percent and a carboxyl group increase less than about 150 percent after heating for 20 minutes at a temperature of 300° C.

8. A shaped article according to claim 5 in which the polyester is polyethylene terephthalate.